United States Patent
Nishiguchi

(10) Patent No.: US 6,490,576 B1
(45) Date of Patent: Dec. 3, 2002

(54) ELECTRONIC APPARATUS HAVING A DICTIONARY FUNCTION

(75) Inventor: Shinichi Nishiguchi, Nabari (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/472,009

(22) Filed: Dec. 27, 1999

(30) Foreign Application Priority Data

Dec. 28, 1998 (JP) .............................................. 10-373100

(51) Int. Cl.$^7$ ........................... G06F 17/30; G06F 15/00
(52) U.S. Cl. ........................................... 707/3; 707/529
(58) Field of Search .............................. 707/3.529, 531, 707/532, 104.1; 704/277, 254, 2–7; 345/173, 174, 176–179; 455/90, 128, 552–575; 395/2.54, 2.63, 2.86, 277; 360/200, 900, 419, 434

(56) References Cited

U.S. PATENT DOCUMENTS

| | | | | |
|---|---|---|---|---|
| 4,748,589 A | * | 5/1988 | Kanou et al. ................... 704/7 |
| 5,724,526 A | * | 3/1998 | Kunita ........................ 704/277 |
| 6,085,204 A | * | 7/2000 | Chijiwa et al. ............. 707/529 |
| 6,088,024 A | * | 7/2000 | Yamagata .................... 345/173 |

FOREIGN PATENT DOCUMENTS

JP     A-6-83860     3/1994

* cited by examiner

*Primary Examiner*—Safet Metjahic
*Assistant Examiner*—Te Yu Chen
(74) *Attorney, Agent, or Firm*—Nixon & Vanderhye P.C.

(57) ABSTRACT

An electronic dictionary has a keyboard having a format key, a priority key, and a non-display key. Operation of the format key causes a display format for a currently displayed word to be stored in a display format storage area of a RAM. Operation of the priority key causes priorities for display of pieces of information associated with the currently displayed word to be stored in a display priority storage area of the RAM. Operation of the non-display key causes a currently displayed item that is desired not to be displayed to be stored in a non-display item storage area of the RAM. Upon operation of retrieval key, a CPU performs a display processing for displaying a retrieved word on an LCD according to the contents stored in each storage area of the RAM.

12 Claims, 15 Drawing Sheets

Fig.3

| FORMAT NO. | |
|---|---|
| 0 | a, A |
| ⋮ | ⋮ |
| 1 | god |
| ⋮ | ⋮ |
| 0 | zzz |

Fig.4A

| PRIORITIES OF PARTS OF SPEECH | |
|---|---|
| a, A | NOUN - 0 |
| ... | ... |
| god | NOUN - 0 |
| ... | ... |
| homing | NOUN - 0 |
| | ADJ. - 2 |
| ... | ... |
| zzz | NOUN - 0 |

Fig.4B

| | DEPTH | PRIORITIES OF EQUIVALENTS | |
|---|---|---|---|
| a, A | 0 | 1 | |
| | 0 | 2 | |
| | ... | ... | |
| god | 0 | 1 | NOUN - EQUIVALENT 0 [- n. (pl. ...] |
| | 0 | 3 | NOUN - EQUIVALENT 1 [1 [G~...] |
| | 0 | 4 | NOUN - EQUIVALENT 2 [2 ⓒ 多...] |
| | 0 | 2 | NOUN - EQUIVALENT 3 [3 ⓒ 神像...] |
| | ... | ... | |
| | 1 | 1 | NOUN - EXAMPLE 1 [the God's...] |
| | 1 | 2 | NOUN - EXAMPLE 2 [God's ear...] |
| | ... | ... | |
| homing | | 1 | |
| | | 2 | |
| | | 3 | |
| | ... | ... | |
| zzz | | | |

*Fig.5*

| WORD NO. | ITEM NO. |
|---|---|
| WORD NO. OF GOD | ITEM NO. OF NOUN - EQUIVALENT 1 |
| WORD NO. OF GOD | ITEM NO. OF NOUN - EXAMPLE 2 |
|  |  |

Fig.6A

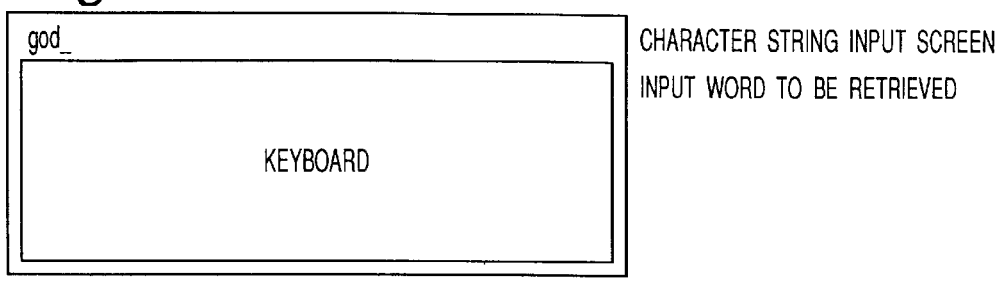

CHARACTER STRING INPUT SCREEN

INPUT WORD TO BE RETRIEVED

Fig.6B

| HEADWORD | IDIOM | COMPOUND | ↓ | god/gad (「お祈りされる人」が原義)
- n. (pl.~s/gɑdz/:<f.>~・dess)
1 [G~][U] (特にキリスト教の) 神,創造主,
  造物主,万有の神<外来形容詞divine>   [ex.]
2 [C] (多神教で、特定の属性を持つ) 神；(特にギリシア
  ・ローマ神話の) 男神   [ex.] [comm.]

DEPRESS "RETRIEVAL" KEY

DISPLAY EQUIVALENTS TO "GOD"

Fig.6C

| HEADWORD | IDIOM | COMPOUND | ↓ |

[1] god
[2] - n.
[3] 1 神,創造主,造物主,万有の神
[4] 2 神；男神
[5] 3 神像,偶像；神とあがめられた人；影響力
[6] 4 天井さじき,大向う

DEPRESS "LIST DISPLAY" KEY

DISPLAY LIST OF EQUIVALENTS

Fig.6D

| HEADWORD | IDIOM | COMPOUND | ↑↓ |

1 [G~][U] (特にキリスト教の) 神,創造主,
  造物主,万有の神<外来形容詞divine>   [ex.]
2 [C] (多神教で、特定の属性を持つ) 神；(特にギリシア
  ・ローマ神話の) 男神   [ex.] [comm.]

SELECT [3]

DISPLAY STARTING FROM NOUN - EQUIVALENT 1

Fig.6E

| HEADWORD | IDIOM | COMPOUND | ↓ | ex.: [god]
  ・the God's book
    聖書 (the Bible)
  ・God's earth
    全世界
  ・God's (own) country SELECT "ex." BUTTON OF NOUN - EQUIVALENT 1

DISPLAY EXAMPLES OF "GOD"

Fig.7A

| HEADWORD | IDIOM | COMPOUND | | ↓ | god/gad (「お祈りされる人」が原義)
- n. (pl.~s/gadz/:<f.>~・dess)
1 [G~][U] (特にキリスト教の) 神,創造主,
　造物主,万有の神<外来形容詞divine>　　[ex.]
2 [C] (多神教で、特定の属性を持つ) 神；(特にギリシア
・ローマ神話の) 男神　　　　　　　[ex.] [comm.]

DISPLAY EQUIVALENTS TO "GOD"

Fig.7B

| HEADWORD | IDIOM | COMPOUND | | ↓ |

[1] god
[2] - n.
[3] 1　神,創造主,造物主,万有の神
[4] 2　神：男神
[5] 3　神像,偶像；神とあがめられた人：影響力
[6] 4　天井さじき,大向う

DEPRESS "LIST DISPLAY" KEY

DISPLAY LIST OF EQUIVALENTS

Fig.7C

| HEADWORD | IDIOM | COMPOUND | ※ | ↓ |

[1] god
[2] - n.
[3] 1　神,創造主,造物主,万有の神
[4] 2　神：男神
[5] 3　神像,偶像；神とあがめられた人：影響力
[6] 4　天井さじき,大向う

DEPRESS "FORMAT" KEY

Fig.7D

| HEADWORD | IDIOM | COMPOUND | ※ | ↓ |

[1] god
[2] - n.
[3] 1　神,創造主,造物主,万有の神
[4] 2　神：男神
[5] 3　神像,偶像；神とあがめられた人：影響力
[6] 4　天井さじき,大向う

AT NEXT RETRIEVAL

CALL LIST OF EQUIVALENTS

Fig.7E

| HEADWORD | IDIOM | COMPOUND | | ↓ | god/gad (「お祈りされる人」が原義)
- n. (pl.~s/gadz/:<f.>~・dess)
1 [G~][U] (特にキリスト教の) 神,創造主,
　造物主,万有の神<外来形容詞divine>　　[ex.]
2 [C] (多神教で、特定の属性を持つ) 神；(特にギリシア
・ローマ神話の) 男神　　　　　　　[ex.] [comm.]

DEPRESS "NORMAL DISPLAY" KEY

NORMAL DISPLAY

Fig.8A

| HEADWORD | IDIOM | COMPOUND | | ↓ | god/gad (「お祈りされる人」が原義)
- n. (pl.~s/gΛdz/:⟨f.⟩~・dess)
1 [G~][U] (特にキリスト教の) 神,創造主,
造物主,万有の神⟨外来形容詞divine⟩　　　[ex.]
2[C] (多神教で、特定の属性を持つ) 神；(特にギリシア
・ローマ神話の) 男神　　　　　　　　[ex.] [comm.]

DISPLAY EQUIVALENTS TO "GOD"

Fig.8B

| HEADWORD | IDIOM | COMPOUND | ※ | ↑↓ |

3[C] 神像,偶像 (idol) ；(...にとって) 神とあが
められた人 (物)；(他の人より) (...にとって) 影響
力[資質]のある人　　　　　　　　　　[ex.]
4⟨英略式⟩[the~s] (劇場の) 天井さじき (の観客、
大向こう⟨この席が天井 (heaven) に近いところ
から⟩

PLACE NOUN-EQUIVALENT 3 AT THE HEAD AND DEPRESS "PRIORITY" KEY

Fig.8C

| HEADWORD | IDIOM | COMPOUND | ※ | ↓ | god/gad (「お祈りされる人」が原義)
- n. (pl.~s/gΛdz/:⟨f.⟩~・dess)
3[C] 神像,偶像 (idol) ；(...にとって) 神とあが
められた人 (物)；(他の人より) (...にとって) 影響
力[資質]のある人　　　　　　　　　　[ex.]
1 [G~][U] (特にキリスト教の) 神,創造主,

AT NEXT RETRIEVAL

DISPLAY NOUN-EQUIVALENT 3 IN PREFERENCE

Fig.8D

| HEADWORD | IDIOM | COMPOUND | | ↓ | god/gad (「お祈りされる人」が原義)
- n. (pl.~s/gΛdz/:⟨f.⟩~・dess)
1 [G~][U] (特にキリスト教の) 神,創造主,
造物主,万有の神⟨外来形容詞divine⟩　　　[ex.]
2[C] (多神教で、特定の属性を持つ) 神；(特にギリシア
・ローマ神話の) 男神　　　　　　　　[ex.] [comm.]

DEPRESS "NORMAL DISPLAY" KEY

NORMAL DISPLAY

Fig.9A

| HEADWORD | IDIOM | COMPOUND | | ↓ |
|---|---|---|---|---| god/gɑd (「お祈りされる人」が原義)
- n. (pl.~s/gʌdz/:<f.>~・dess)
1 [G~][U](特にキリスト教の) 神,創造主,
　造物主,万有の神<外来形容詞divine>　　　[ex.]
2[C](多神教で、特定の属性を持つ) 神；(特にギリシア
・ローマ神話の) 男神　　　　　　　[ex.] [comm.]

DISPLAY EQUIVALENTS TO "GOD"

Fig.9B

| HEADWORD | IDIOM | COMPOUND | | ↓ |
|---|---|---|---|---| ex.: [god]
　・the God's book
　　聖書 (the Bible)
　・God's earth
　　全世界
　・God's (own) country SELECT "ex." BUTTON OF
NOUN - EQUIVALENT 1

DISPLAY EXAMPLES OF "GOD"

Fig.9C

| HEADWORD | IDIOM | COMPOUND | ※ | ↓ |
|---|---|---|---|---| ex.: [god]
　・the God's book
　　聖書 (the Bible)
　・God's earth
　　全世界
　・God's (own) country

DEPRESS "PRIORITY" KEY

Fig.9D

| HEADWORD | IDIOM | COMPOUND | ※ | ↓ |
|---|---|---|---|---| god/gɑd (「お祈りされる人」が原義)
- n. (pl.~s/gʌdz/:<f.>~・dess)
1 [G~][U](特にキリスト教の) 神,創造主,
　造物主,万有の神<外来形容詞divine>
　・the God's book
　　聖書 (the Bible)

AT NEXT RETRIEVAL

DISPLAY EXAMPLES OF "GOD" IN
PREFERENCE

Fig.10A

| HEADWORD | IDIOM | COMPOUND | | ↓ | god/gad (「お祈りされる人」が原義)
- n. (pl.~s/gadz/:<f.>~・dess)
1 [G~]U (特にキリスト教の) 神,創造主,
  造物主,万有の神<外来形容詞divine>  [ex.]
2 C (多神教で、特定の属性を持つ) 神；(特にギリシア
  ・ローマ神話の) 男神  [ex.] [comm.]

DISPLAY EQUIVALENTS TO "GOD"

Fig.10B

| HEADWORD | IDIOM | COMPOUND | | ↓ |

1 [G~]U (特にキリスト教の) 神,創造主,
  造物主,万有の神<外来形容詞divine>  [ex.]
2 C (多神教で、特定の属性を持つ) 神；(特にギリシア
  ・ローマ神話の) 男神  [ex.] [comm.]

DISPLAY NON-EQUIVALENTS 1 AT THE HEAD

Fig.10C

| HEADWORD | IDIOM | COMPOUND | ※ | ↓ | god/gad (「お祈りされる人」が原義)
- n. (pl.~s/gadz/:<f.>~・dess)
2 C (多神教で、特定の属性を持つ) 神；(特にギリシア
  ・ローマ神話の) 男神  [ex.] [comm.]
3 C 神像,偶像 (idol)；(...にとって) 神とあが
  められた人 (物)；(他の人より) (...にとって)

DEPRESS "NON-DISPLAY" KEY

Fig.10D

| HEADWORD | IDIOM | COMPOUND | | ↓ | ex.: [god]
  ・a feast [sight] for the ~s
    ・
    ・
    ・

DISPLAY EXAMPLES OF NOUN-EQUIVALENT 2

Fig.10E

| HEADWORD | IDIOM | COMPOUND | ※ | ↓ | god/gad (「お祈りされる人」が原義)
- n. (pl.~s/gadz/:<f.>~・dess)
2 C (多神教で、特定の属性を持つ) 神；(特にギリシア
  ・ローマ神話の) 男神  [comm.]
3 C 神像,偶像 (idol)；(...にとって) 神とあが
  められた人 (物)；(他の人より) (...にとって)

DEPRESS "NON-DISPLAY" KEY
"ex." BUTTON DISAPPEARS

ELECTRONIC APPARATUS HAVING A
DICTIONARY FUNCTION

BACKGROUND OF THE INVENTION

The present invention relates to electronic apparatuses having a dictionary function, such as an electronic dictionary and a personal computer.

There has conventionally been provided a variety of electronic dictionaries.

For example, an electronic dictionary is known from Japanese Patent Laid-Open Publication No. HEI 6-83860, which stores dictionary information such as selectively retrieved English words and their Japanese equivalents in a storage area, and repeatedly reads and outputs the stored dictionary information. That is, this electronic dictionary is intended to improve the memory efficiency and calling speed by storing words selected from the electronic dictionary as well as a part or all of meanings of each of the words in an storage area and repetitively retrieving the same from the storage area.

The above electronic dictionary, however, does not have a function of making a user to designate, for each word, different display modes in which equivalents in a target language to a word in a source language are displayed. In other words, in the conventional electronic dictionary, a same display mode is used for all the words. Generally speaking, however, preferable display modes should differ depending on the learning stage of each user. For example, for certain words of which the meanings are almost known to a user, a list of equivalents to the words would be sufficient for the user. On the other hand, for words that are hard for a user to remember, display of equivalents in a detailed manner would be necessary. There may be cases in which a word is hard for a user to use so that the user wishes to have examples (example sentences and phrases) of the word or explanation or commentary about the word preferentially displayed. Unfortunately, however, the prior art electronic dictionary cannot sufficiently cope with these cases.

Furthermore, according to the prior art electronic dictionary, the order in which equivalents to a word are sequentially displayed conforms either to the content of a dictionary which was used as a basis of the electronic dictionary, or to specified rules such as parts of speech, frequency of use, degree of importance, etc. of each word. However, it is possible that a user wishes an equivalent to a word to precede the other equivalents to the word on a display screen. It is also possible that with regard to each word, a user has completely memorized equivalents and does not wish them to be displayed. The prior art electronic dictionary, however, does not fail to display even equivalents which are not wished to be displayed. As a result, disadvantageously, with the conventional electronic dictionary, the user cannot speedily get an equivalent that the user really needs from all the equivalents.

SUMMARY OF THE INVENTION

An object of the present invention is to solve the aforementioned problems and provide a user-friendly electronic apparatus having a dictionary function which has different display modes and allows a user to designate a desired display mode for each word according to the purpose of the user, which is capable of changing the order in which display items are arranged every word, and which also allows a user to designate non-display of unnecessary items that should disappear from a display screen.

In order to accomplish the object, an electronic apparatus having a dictionary function according to a first aspect of the present invention comprises:

a display section;

a storage section for storing a display format for each of words;

a format key for making the storage section store a currently used display format; and a display processing functional section for performing a display processing to make the display section display a retrieved word and pieces of information associated therewith in a corresponding display format stored in the storage section.

With this arrangement, if the currently used display format for a certain word on display is a display format desired by a user, the user depresses the format key in that state, thereby storing the display format in the storage section. Therefore, upon retrieval of the word next time, the word and its associated information will be displayed in the format stored in the storage section.

An electronic apparatus having a dictionary function according to a second aspect of the present invention comprises:

a display section;

a storage section for storing, for each of words, priorities according which pieces of information associated with a word are to be displayed by the display section;

a priority key for designating priorities; and a display processing functional section for performing a display processing to make the display section display pieces of information associated with a retrieved word in the order of priorities stored in the storage section.

With this arrangement, if a user scrolls the currently displayed information and depresses the priority key in a state in which the display section is displaying a piece of information (e.g., a third equivalent to the retrieved word) that the user wishes to be displayed in preference, then designation information for giving priority for display to the piece of information (the third equivalent) over the other pieces of information is stored in the storage section. Therefore, at the next time of retrieval of the same word, of all the equivalents to the word, the third equivalent, for example, will be displayed in the first place according to the designation information stored in the storage section.

An electronic apparatus having a dictionary function according to a third aspect of the present invention comprises:

a display section;

a storage section for storing, for each of words, display levels at which pieces of information associated with each word are to be displayed;

a key for designating a display level for a word; and a display processing functional section for performing a display processing to make the display section display a retrieved word and pieces of information associated therewith at a corresponding display level stored in the storage section.

The term "display level" or "level" used herein, which is also referred to as "depth" herein, should be understood as follows. A first screen displaying equivalents which normally appears at the first call is at Level 0, for example. A second screen which appears when designating, for example, an item "example" on the first screen, is at Level 1, for example. The screen at Level 1 displays example sentences and phrases of the retrieved word. A next screen derived from the second screen is at Level 2. That is, mutually linked screens consisting of a basis screen and the subordinate screens are serially opened from one screen to next, and the order in which these screens are called and opened is expressed by numbers 0, 1, 2, . . . , and those numbers 0, 1, 2, . . . are herein defined as the "display levels" or "depths".

The display levels may be assigned to each of pieces of information (such as equivalents, examples, etc.) associated with a word. For example, the user may designate an item name "example" displayed on the basis screen (Level 0) which appears at the first call, to have example sentences and phrases (Level 1) displayed on the next screen. In this case, if the user depresses the key for designating a display level while the example sentences and phrases are displayed, then the display level for the example sentences and phrases will be changed from Level 1 to Level 0 so as to be preferentially displayed. By this operation, the example sentences and phrases, which are information having its display level changed to 0, will be displayed on the first screen at the next time of retrieval of the relevant word.

An electronic apparatus having a dictionary function according to a fourth aspect of the present invention comprises:

a display section;

a storage section for storing, for each of words, items not to be displayed;

a non-display key for designating an item not to be displayed; and a display processing functional section for performing a display processing to make the display section display items other than the items not to be displayed stored in the storage section.

With this arrangement, if a user does not need display of a certain item which is currently displayed, then the user may depress the non-display key in this state, thereby making the storage section store information on the item. Then, the item, stored in the storage section, will not be displayed at the next retrieval of the relevant word.

The electronic apparatus according to any of the first, second, third and fourth aspects may further comprise a normal display key for temporarily bring the apparatus into a normal display mode. In this case, the display processing functional section is configured so as to change a current screen of the display section to a screen according to the normal display mode when the normal display key is operated during a certain display mode other than the normal display mode, and to restore the certain display mode upon cancellation of the normal display mode.

With this arrangement, switching between the normal display mode and a special display mode designated by the user can be executed at any time when desired.

The term "normal display mode" herein refers to a display mode according to initial settings for the apparatus.

Furthermore, when the electronic apparatus has the normal display key, the display processing functional section may be configured so as to make the screen of the display section contain a symbol indicating that a current display mode is not the normal display mode while the apparatus is not assuming the normal display mode. With this arrangement, the user can definitely distinguish whether the current display mode is the normal display or not.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 3 shows the content of a display format storage area of a RAM;

FIGS. 4A and 4B show the contents of different areas of a display priority storage area of the RAM;

FIG. 5 shows the content of non-display item storage area of the RAM;

FIGS. 6A, 6B, 6C, 6D and 6E are explanatory views showing examples of display screens when normal display is executed;

FIGS. 7A, 7B, 7C, 7D and 7E are explanatory views showing examples of display screens when a display format is designated;

FIGS. 8A, 8B, 8C and 8D are explanatory views showing examples of display screens when priority for display of an equivalent is designated;

FIGS. 9A, 9B, 9C and 9D are explanatory views showing examples of display screens when priority for display of example sentences and phrases is designated;

FIGS. 10A, 10B, 10C, 10D and 10E are explanatory views showing examples of display screens when an item is designated as a non-display item;

DETAILED DESCRIPTION OF THE PREFERRED EMBODIMENTS

Figure 2:
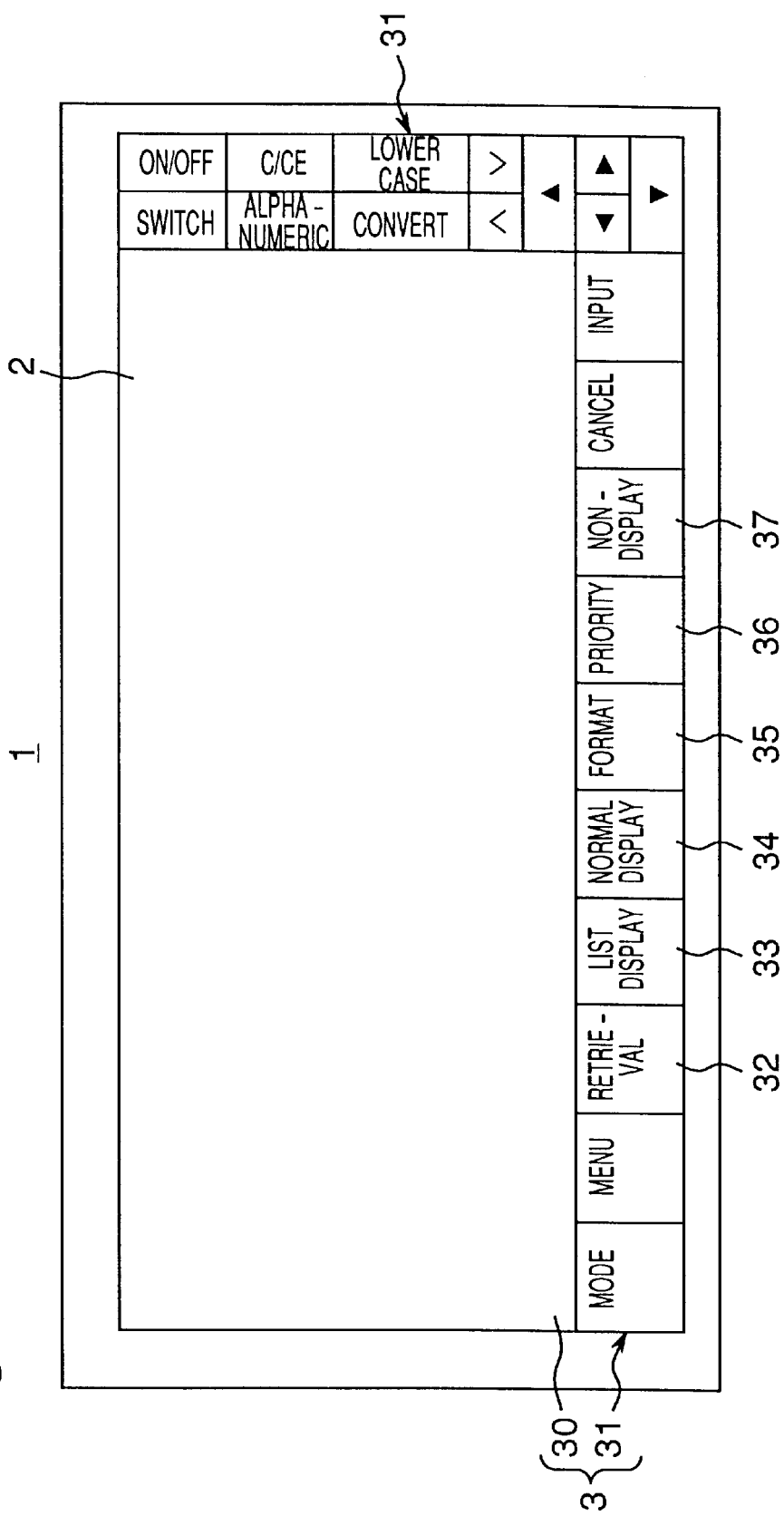
FIG. 2 is an external view of the electronic dictionary.

FIG. 2 is an external view of an embodiment of the electronic apparatus having a dictionary function according to the present invention, wherein the electronic apparatus is an electronic dictionary.

The electronic dictionary 1 is provided with a display device 2 and a keyboard 3. This electronic dictionary 1 is a touch-panel type electronic dictionary capable of executing a variety of operations such as word selection and location designation with the touch of the screen. The electronic dictionary is configured so that a keyboard for input of characters or letters is displayed on the screen, and that all operations including entry of characters can be executed with the touch of the screen.

Accordingly, the keyboard 3 is constructed of touch-panel type keys 30 on the display device 2 and fixed keys 31.

The touch-panel type keys 30 have transparency in order not to hinder the display device 2 from displaying a screen. The keys 30 are arranged in a matrix form. A variety of keyboards are constructed by displaying keys on the display device 2, and information associated with a key is selected by the touch of the corresponding key portion on the display device 2.

Of the fixed keys 31, a key 32 is a retrieval key for retrieving a word, and a key 33 is a list display key for simply displaying a list of equivalents to a-word. A key 34 is a normal display key for restoring a normal display screen (a screen in the normal display mode) during an exceptional display mode according to designated priority, display with unnecessary items being not displayed, or other non-normal display. A key 35 is a format key for designating a display format at which the screen is to be called. A key 36 is a priority key (serving also as the key for designating a display level) for designating priorities for display of pieces of information, i.e., the order in which the pieces of information should be arranged on the screen. A key 37 is a non-display key for suppressing the display of unnecessary items.

Figure 1:
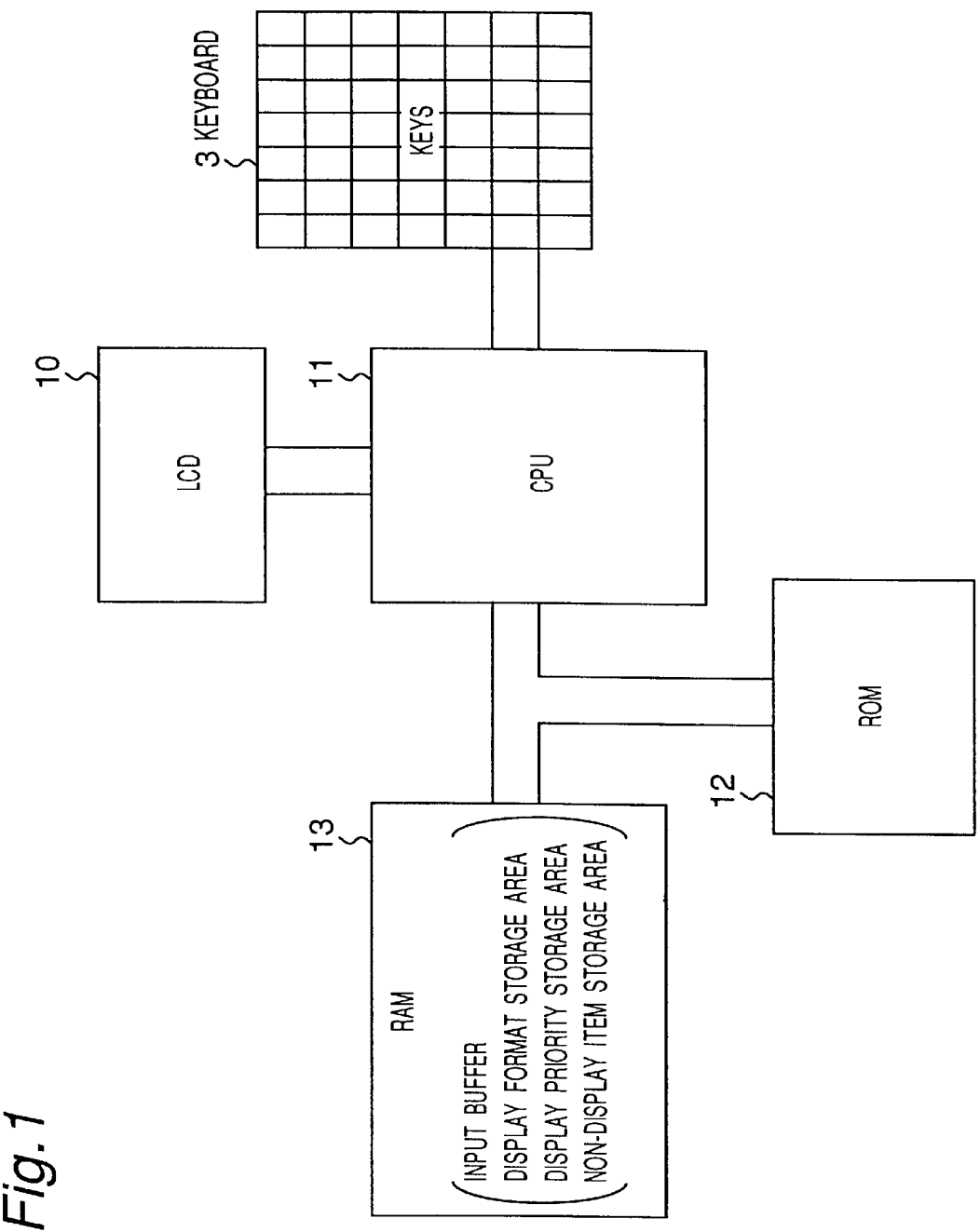
FIG. 1 is a block diagram showing the configuration of an electronic dictionary according to one embodiment of the electronic apparatus of the present invention.

FIG. 1 is a block diagram showing the system configuration of the electronic dictionary 1 having the above arrangement.

This electronic dictionary 1 is constructed essentially of the keyboard 3 comprised of the touch-panel type keys 30 and the fixed type keys 31, a liquid crystal display 10 that serves as a display section of the display device 2, a CPU (which is a display processing functional section as recited in the claims) 11 for controlling the electronic dictionary functions, a programmable ROM 12 that holds programs, data, and the like for the electronic dictionary functions, and a RAM 13 having a variety of storage areas. These components are connected together by way of a data bus and a control bus.

The RAM 13 has a variety of storage areas including an input buffer, a display format storage area for storing display formats, a display priority storage area for storing priorities for display of various pieces of information, and a non-display item storage area for storing non-display items.

Figure 3:
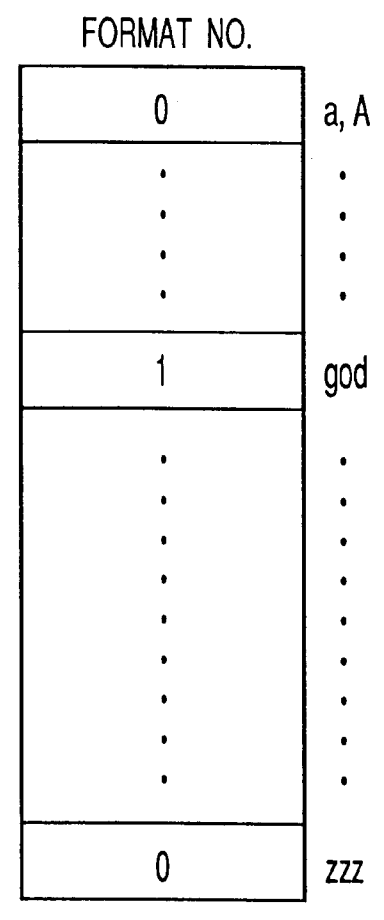

FIG. 3 shows the content of the display format storage area of the RAM 13. The display format storage area consists of fixed-length rewritable storage areas for each of the words arranged in alphabetical order. These areas initially hold preset format numbers (for example, "0" for normal display and "1" for list display). If a display format for a word is designated or specified while the word is being displayed, then the storage area corresponding to the word is rewritten to change the stored format number to the number for the designated format. The maximum value of the format number may be set as desired.

FIGS. 4A and 4B show the content of a display priority storage area of the RAM 13. The display priority storage area includes storage areas, shown in FIG. 4A, for holding information on priorities assigned to parts of speech of each word, according to which equivalents to a word at different parts of speech are arranged on the screen when displayed. The number of storage areas assigned to one word corresponds to the number of parts of speech of the word. These storage areas hold numbers representing the priorities of the parts of speech, such as, for example, 0 for the part "noun", 1 for the part "verb", 2 for the part "adjective", and so on. If the priority key 36 is depressed when a part of speech of a word, which has a plurality of kinds of parts of speech, is displayed at the head, in other words, if a part of speech of a word is designated for preferential display, then the storage areas for the word are rewritten to give a highest priority to the designated part of speech. For example, the priority key 36 is depressed when the part "verb" is displayed at the head, then the number for the part "verb" in the corresponding storage area is changed from 1 to 0 and the number for the part "noun" is changed from 0 to 1.

The display priority storage area also includes rewritable storage areas, shown in FIG. 4B, for holding information on display levels (in other words, depths) and priorities assigned to each of groups of equivalents and of examples at each part of speech of a word. (Equivalents and examples are grouped according to the meaning or sense.) The storage areas correspond to the groups of equivalents and of examples in one to one correspondence. When a word is retrieved and displayed, groups of equivalents at one part of speech are arranged on the screen according to the priorities stored in the corresponding storage areas. Note that in FIG. 4B, each group of equivalents is expressed as simply "EQUIVALENT 1", "EQUIVALENT 2", and so on, and each group of examples (example sentences and/or phrases) is expressed as simply "EXAMPLE 1", "EXAMPLE 2".

Regarding the levels (depths), in this example, Level 0 corresponds to a basis screen for display of equivalents which is normally initially called, and Level 1 corresponds to a next screen for display of examples that is called when designating an item "Example" (shown as "EX." in the figures) displayed on the basis screen. It is to be noted that those having the initial value of level (depth) of "0" are not allowed to have a depth other than the depth 0, but those having the initial value of depth of "1" are allowed to selectively assume both values of 0 and 1. Namely, a depth value of 0 is assumed when relevant information is designated for the priority display, and a depth value of 1 is assumed when the relevant information is released from the designation. If a group of examples has a depth value of 0, then the group of examples will be displayed along with equivalents on a basis screen called in the first place. If a group of examples has a depth value of 1, then the group of examples will be displayed on a screen called next for display of examples only.

On the other hand, the storage areas (the right-hand column) store values representing the priorities for displaying equivalents and examples. The initial values of these storage areas are set in ascending order like 1, 2, 3, . . . according to the initial order in which equivalents and examples are arranged in the normal display mode. Upon designation of a certain equivalent or example as a top priority for display, the values of priorities in the relevant areas are changed accordingly.

FIG. 5 shows the content of a non-display item storage area of RAM 13. This storage area holds no data in the initialized state. Upon designation of an item for non-display, information corresponding to the designated item is stored in this storage area. The word number for a word to which the designated item belongs is stored in the left-hand column in the figure which is directed to word numbers, and the item number for the designated item is subsequently stored in the right-hand column. In the shown example, the first equivalent to a word "god" and examples of the second equivalent to the word "god" are designated not to be displayed.

Next, a concrete example of operations of the electronic dictionary 1 for actually displaying word information on the display section will be described with reference to FIGS. 6A–6E through FIGS. 10A–10E illustrating display screen examples and FIG. 11 through FIG. 15 illustrating operation flowcharts. In the following examples, the electronic dictionary 1 functions as an English-Japanese dictionary, in other words, English is used as a source language, and Japanese is used as a target language, although needless to say, the present invention is applicable to any other combination of languages.

(1) A description is first made of a case where retrieval and display are normally executed by the electronic dictionary 1, referring to FIGS. 6A through 6E.

First, a character string of "god" which is a word to be retrieved is entered by means of touch-panel type keys 30 as shown in FIG. 6A. If the retrieval key 32 is depressed in this state, then Japanese equivalents to the word "god" are displayed as shown in FIG. 6B.

The screen shown in FIG. 6B is first explained. Tags of "headword", "idiom" and "compound" located in the first line represent a headword-basis screen (display of equivalents and the like), a idiom-basis screen, and a compound-basis screen, respectively, for the currently retrieved and displayed word. The headword-basis screen is initially called and is changeable to any of the other screens by the touch of the corresponding tag. A mark of downward arrow "↓" displayed on the upper right corner of the screen indicates that display items can be scrolled down, and a mark of upward arrow "↑" indicates that display items can be scrolled up.

The second line shows the headword of "god" that is firstly displayed and may be followed by its pronunciation. The third line shows information such as a part of speech and so on. The fourth line shows EQUIVALENT 1, or the first group of equivalents. An item "ex." shown in the fifth line is a button for shifting to the screen of the example included in (belonging to) EQUIVALENT 1. The sixth line shows EQUIVALENT 2, or the second group of equivalents. Items "ex." and "comm." shown in the seventh line are buttons for shifting to the screen of examples involved in (or belonging to) EQUIVALENT 2 and the screen of commentary on the word in connection with EQUIVALENT 2, respectively.

If the list display key 33 is depressed in the display state shown in FIG. 6B, then the equivalents are displayed in a list form as shown in FIG. 6C. If the number "3" (which is enclosed with a box) is selected during the list display, then the headword-basis screen appears with the equivalents that start from the first group of equivalents as shown in FIG. 6D. If the "ex." button for the first group of equivalents is depressed in the display state of FIG. 6D, then the screen shifts to the screen for example sentences and/or phrases in connection with the first group of equivalents, as shown in FIG. 6E.

The above has described an example of display screens when display is executed normally.

Figure 11:
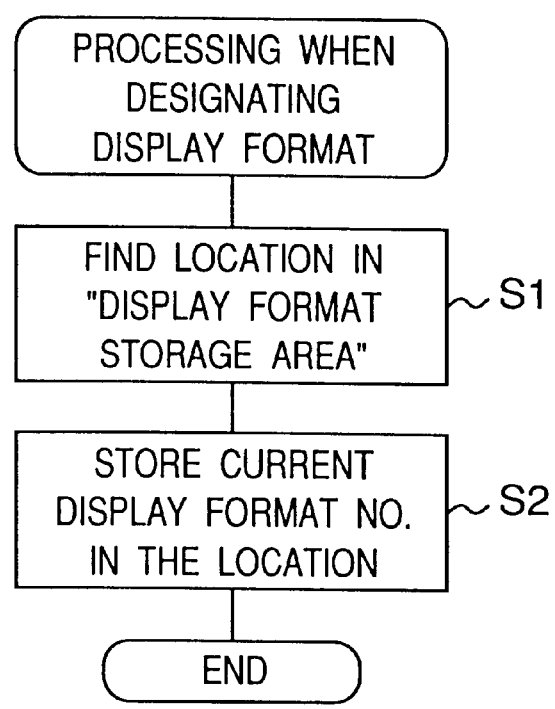
FIG. 11 is a flowchart for explaining a process to be performed upon designation of a display format.

(2) A display operation upon the designation of the display format will be described with reference to the display screen examples shown in FIGS. 7A through 7E and the operation flowchart shown in FIG. 11.

First, the character string of "god" of the word to be retrieved is input by corresponding touch-panel type keys 30. If the retrieval key 32 is depressed in this state, then the equivalents to "god" are displayed as shown in FIG. 7A. If the list display key 33 is depressed in this state, then the equivalents are displayed in a list form as shown in FIG. 7B.

If the format key 35 is depressed during the list display, then information (a value of 1 in the present embodiment) indicating that the format used in the next retrieval stage is of the list display as shown in FIG. 7B is stored in the display format storage area shown in FIG. 3 at the location corresponding to "god". More specifically, the CPU 11 finds the storage location in the display format storage area from the word number of the displayed word "god" (step S1) and stores the format number of the currently used format in the found location of storage (step S2).

Concurrently with the above operation, a symbol "*" is displayed in the first line, as shown in FIG. 7C, meaning that the list display has been designated or specified. The display of the symbol "*" helps the user readily tell between the normal display and an exceptional display (the list display in this case).

At the next retrieval of the word "god", the equivalents to "god" will be called in the form of list display as shown in FIG. 7D. If the normal display key 34 is depressed in the state in which display is executed in the list display format, then the display temporarily shifts to the normal display as shown in FIG. 7E. In order to return to the list display as designated, the normal display key 34 has only to be depressed again. Although only the list display format has been described as an example of a display format to be designated by the user, other formats can be of course used.

Figure 12:
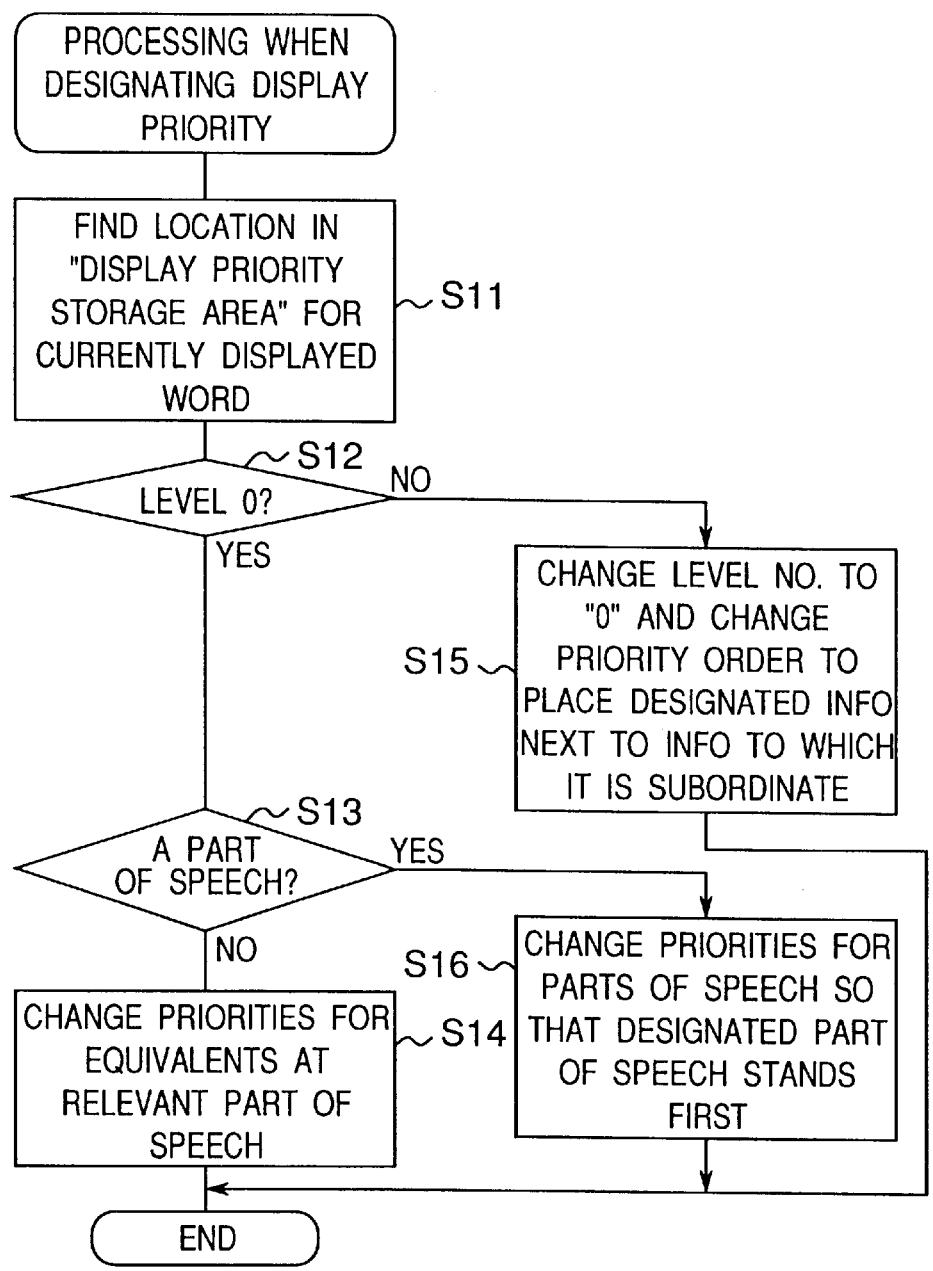
FIG. 12 is a flowchart for explaining a process to be performed upon designation of priority for display of an equivalent.

(3) A processing to be performed when designating display priorities for equivalents will be described with reference to the display screen examples shown in FIGS. 8A through 8D and the operation flowchart shown in FIG. 12.

First, the character string of "god", which is a word to be retrieved, is entered by corresponding touch-panel type keys 30. If the retrieval key 32 is depressed in this state, then the equivalents to the word "god" are displayed as shown in FIG. 8A. Next, the downward arrow "↓" at the upper right corner is depressed to scroll the display content down, thereby displaying, for example, the third group of equivalents, or EQUIVALENT 3, at the head, as shown in FIG. 8B. If the priority key 36 is depressed in this state, then the third group of equivalents displayed at the head is specified as information to be preferentially displayed. That is, priority is given to the third group of equivalents of all groups of equivalents at the part of speech of noun.

The operation of the CPU 11 upon the designation of priority will be described with reference to FIG. 12.

If the priority key 36 is depressed in the state of display shown in FIG. 8B, then the CPU 11 first finds the location in the display priority storage area (see FIG. 4) for the currently displayed word of "god" (step S11). Then, it is determined whether or not a piece of information which has been designated for priority display has a depth (level) of 0 (which value means an initially called screen) (step S12). If the depth (i.e., level) value is not 0, then the operation proceeds to step S15 to set the depth (level) for the piece of information to a value of 0 and further assign to the designated piece of information a priority lower than that of a piece of information to which the designated piece of information is subordinate. That is, when the designated piece of information is subordinate to a certain piece of information as in the case where examples of an equivalent are subordinate to the equivalent, the designated subordinate piece of information will be next to the certain piece of information in priority. If the depth (level) for the designated piece of information is determined to be 0 at step S12, then the program proceeds to step S13 to determine whether or not the priority-designated piece of information is a part of speech. If the designated piece of information is determined to be a part of speech, then the operation proceeds to step S16 to change the priorities of parts of speech so that the designated part of speech stands first. If the information is determined not to be a part of speech in step S13, then the operation proceeds to step S14 since this determination means that an equivalent has been designated for priority display. At step S14, only priorities of the equivalents at a relevant part of speech are changed in the corresponding locations of the storage area with the depth numbers kept intact so that the designated information stands first at the relevant part of speech.

By the above operation, if the word "god" is retrieved at the next time, then the third group of equivalents to the word "god" is displayed at the head of a display area for nouns as shown in FIG. 8C. If the normal display key 34 is depressed in the state of preferential display, then the display temporarily shifts to the normal display (i.e., display in the normal mode according to the initial settings) as shown in FIG. 8D. In order to restore the designated preferential display, the normal display key 34 has only to be depressed again.

(4) The display operation when designating the order of priority of the examples will be described with reference to FIGS. 9A through 9D and FIGS. 12 and 13.

First, the character string of "god", which is a word to be retrieved, is input by the corresponding touch-panel type keys 30. If the retrieval key 32 is depressed in this state, then the Japanese equivalents to the word "god" are displayed as shown in FIG. 9A. Next, if an "ex." button for the first group of equivalents at the noun (NOUN-EQUIVALENT 1) is depressed in this state, then the example sentences and/or phrases associated with the first group of equivalents at the noun are displayed as shown in FIG. 9B. If the priority key 36 is depressed in this state, then these example sentences/or phrases are designated to be preferentially displayed (FIG. 9C).

In this case, what is different from the case where priority is given to a group of equivalents itself as shown in FIG. 8C is that priority is not given to the example sentences and/or phrases over the relevant group of equivalents because the example sentences and/or phrases are dependent from the group of equivalents. Therefore, the example sentences/phrases are displayed on the initially called screen (i.e., a screen at the first level or depth) in a position immediately after the group of equivalents to which the example sentences/phrases belong (See S15 of FIG. 12). Therefore, a customized display screen as shown in FIG. 9D appears in the next time of retrieval of the word "god". To change the customized display shown in FIG. 9D to the normal display, the "normal display" key should be depressed once. To return to the customized display, the "normal display" key should be depressed once again.

Figure 13:
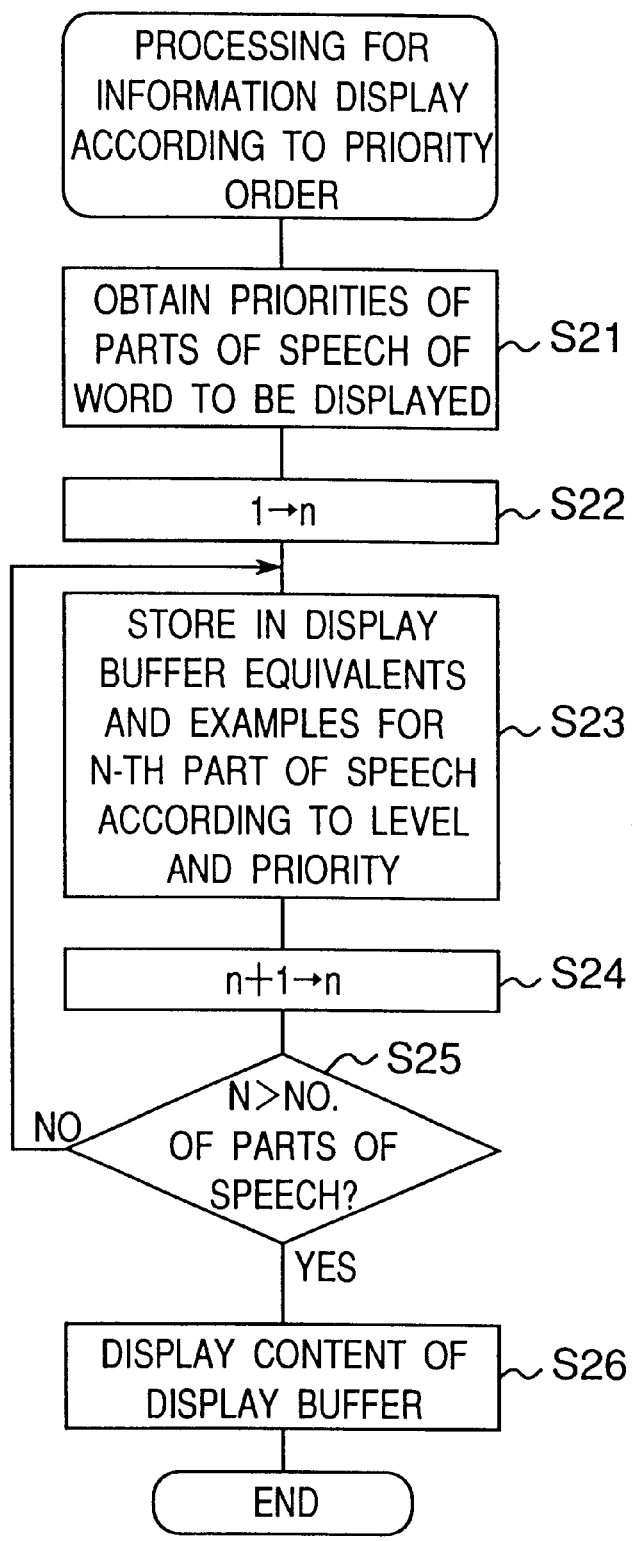
FIG. 13 is a flowchart for explaining a process for displaying information according to priority.

A processing when displaying information according to the order of priority at the next retrieval will be described with reference to FIG. 13.

If the retrieval key 32 is depressed, then the CPU 11 obtains the priorities of the parts of speech of the word to be displayed from the corresponding storage area in the display priority storage area shown in FIG. 4B (step S21). Then, a variable n is set to 1 (step S22) and the equivalents, examples and other pieces of information at the n-th part of speech (the first part in this case) are stored in a display buffer (not shown) according to the depths and display priorities of equivalents (step S23). No actual display is executed in this stage, and the data of equivalents, examples and so on are merely stored in the order in which they are displayed. Next, the variable n is incremented by one (step S24), and it is determined whether or not the value of the variable n has exceeded the number of parts of speech of the word to be displayed (step S25). If the value of variable n has not exceeded the number, then the program returns to step S23 to store the equivalents and example sentences/phrases at the next part of speech into the display buffer according to the depths and priorities of equivalents (step S23). If the value of the variable n is determined to have exceeded the number of parts of speech at step S25, then setting of the display buffer ends and the content of the display buffer is actually displayed (step S26). If scrolling or the like is executed in this stage, then the display will reflect this.

Figure 14:
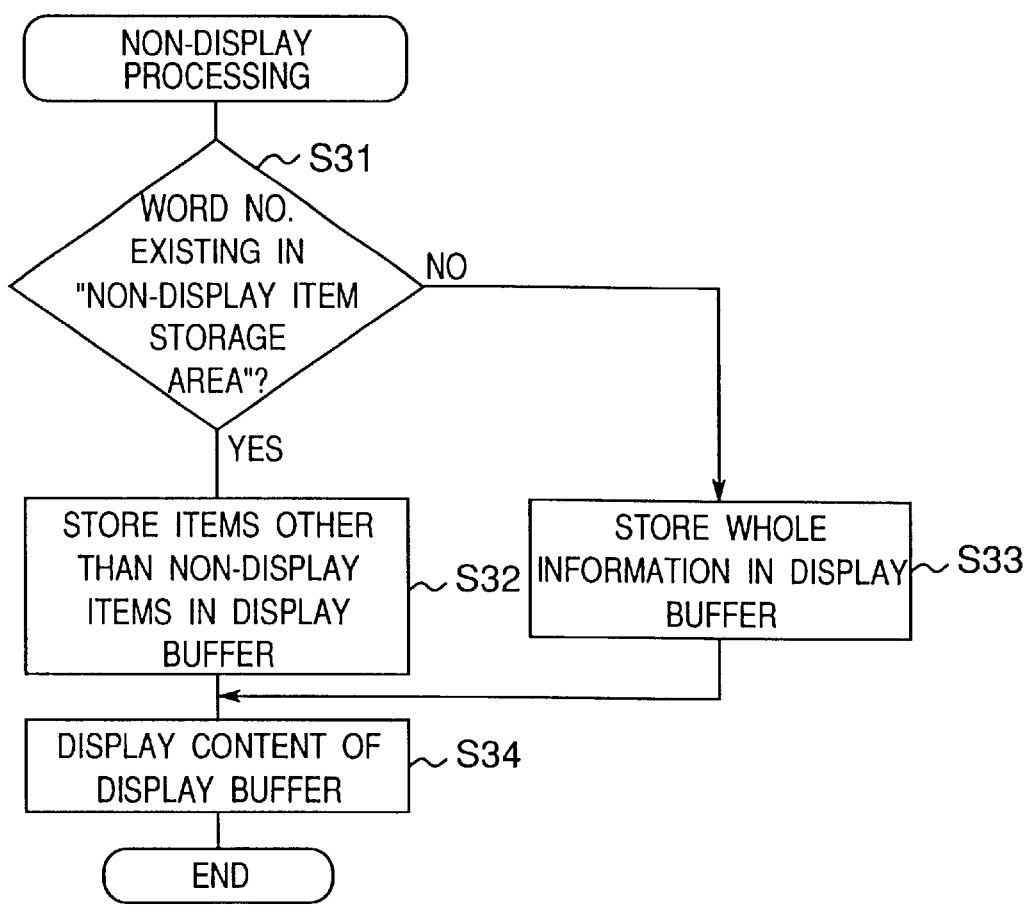
FIG. 14 is a flowchart for explaining a nondisplay process for the designated item.

(5) The display operation when unnecessary items are not displayed will be described with reference to the display screen examples shown in FIGS. 10A through 10E and the operation flowchart shown in FIG. 14.

First, the character string of "god", which is the word to be retrieved, is inputted by the corresponding touch-panel type keys 30. If the retrieval key 32. is depressed in this state, then the Japanese equivalents to "god" are displayed as shown in FIG. 10A. Next, the downward arrow "↓" button at the upper right corner of the screen is depressed to scroll down the screen to thereby display, for example, the first group of equivalents at the noun (NOUN-EQUIVALENT 1) at the head of the screen, as shown in FIG. 10B. If the non-display key 37 is depressed in this state, then the item number of the first group of equivalents at the noun is stored into the non-display item storage area shown in FIG. 5. Therefore, the first group of equivalents at the noun that was initially displayed at the head is now not displayed, as shown in FIG. 10C. If, for example, an "ex." button directed to the examples of the second group of equivalents at the noun (NOUN-EXAMPLE 2) is depressed in this state of display, then the example sentences and/or phrases subordinate to the second group of equivalents at the noun are displayed, as shown in FIG. 10D. If the non-display key 37 is depressed in this state, then the item number for the examples of the second group of equivalents at the noun (NOUN-EXAMPLE 2) is stored into the non-display item storage area shown in FIG. 5. Therefore, the "ex." button for the second group of equivalents disappears from the screen, as shown in FIG. 10E.

By the above operation, next time the "god" is retrieved, the equivalents to "god" will be displayed except the first group of equivalents at the noun and the "ex." button for the second group of equivalents, as shown in FIG. 10E. If the normal display key 34 is depressed in the mode of non-display of the designated items, then the display temporarily shifts to the normal display mode according to the initial settings (see FIG. 10A). Simply depressing again the normal display key 34 will restore the apparatus to the non-display mode.

The non-display processing operation for the designated item will be described with reference to FIG. 14.

If, for example, the retrieval key 32 is depressed, then the CPU 11 determines whether or not the word number of a word to be displayed is in the non-display item storage area shown in FIG. 5, in other words, whether or not the word to be displayed has been designated as a non-display item (step S31). If the word number for the word is not in the non-display item storage area, then the operation proceeds to step S33 to store all data for the word in the display buffer according to the normal operation. If the word number is in the non-display item storage area, then the operation proceeds to step S32 at which the data for the word other than a relevant non-display item is stored in the display buffer. Subsequently, the content of the display buffer is displayed (step S34).

Figure 15:
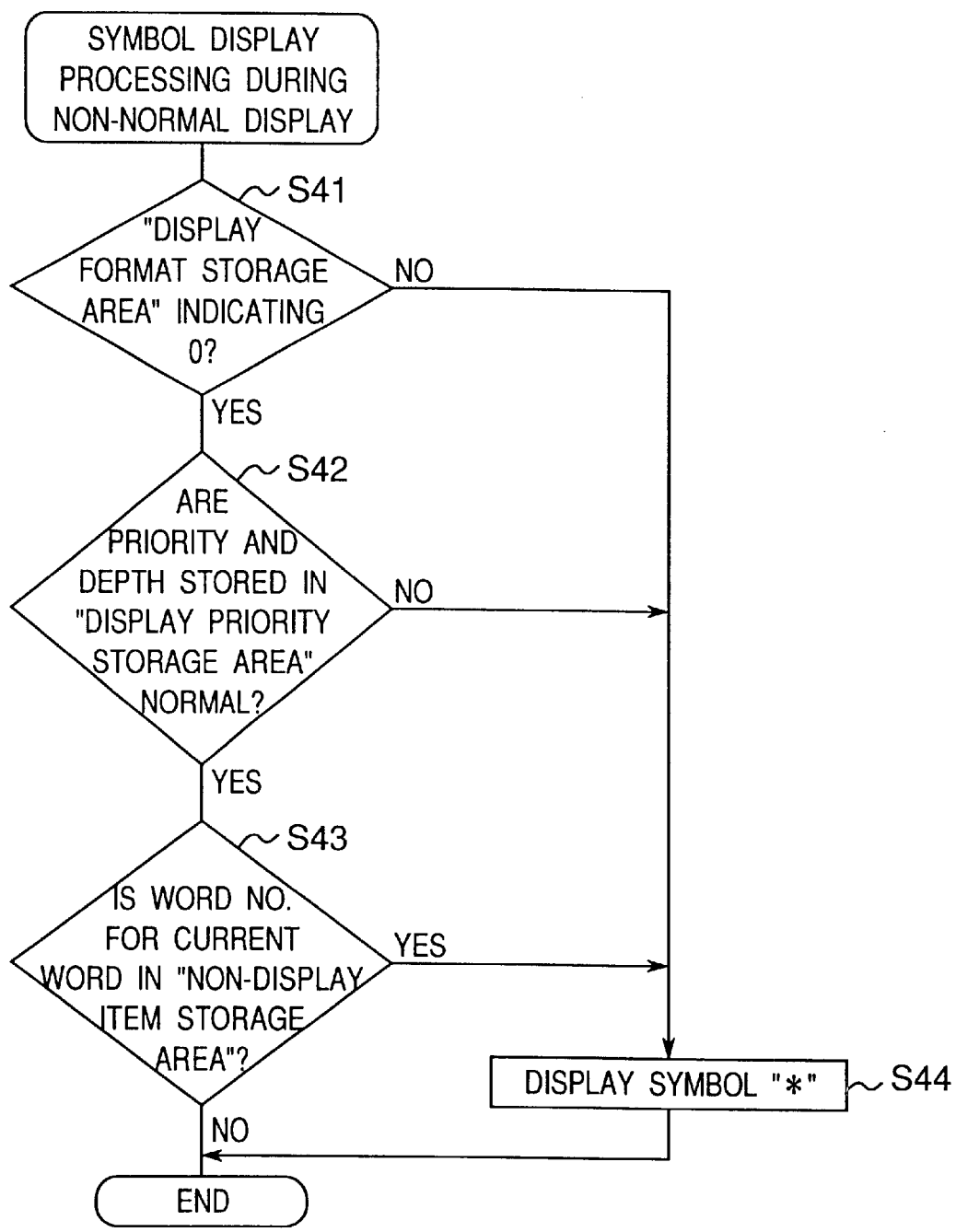
FIG. 15 is a flowchart for explaining processing for displaying a symbol "*" during a display mode other than normal display.

(6) The following describes a processing for displaying the symbol "*" during the display modes other than the normal display mode as described in (2) through (5) above, with reference to FIG. 15 which is a flowchart therefor.

If the retrieval key 32 is depressed, then the CPU 11 checks whether or not the display format storage area (see FIG. 3) for a currently displayed word holds a value of 0 (i.e., the normal format) (step S41). If the value stored in the area is not 0, that is, if the format is not the normal format, then the operation proceeds to step S42 to display the symbol "*". If the format is the normal format, then the operation proceeds to step S42 to check whether or not the content (depths and priority orders for equivalents) for the currently displayed word stored in the display priority storage area (see FIG. 4) is normal, in other words, as initially set. If the content of the display priority storage area for the word is not normal, or not as initially set, then the operation proceeds to step S42 to display the symbol "*". Otherwise, the operation proceeds to step S43 to further check whether or not the word number for the currently displayed word exists in the non-display item storage area (see FIG. 5). If the word number exists in the non-display item storage area, then the operation proceeds to step S42 to display the symbol "*". If the word number does not exist in the non-display item storage area, i.e., in the case of the normal display, then the processing ends without displaying the symbol "*".

As will be readily understood, the symbol indicating that the current display is not the normal display is not limited to "*", and other appropriate signs, marks, characters or the like may be used.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An electronic apparatus having a dictionary function, comprising:
    a display section;
    a storage section for storing at least first and second alternative display formats for each of a plurality of words;
    a key for making the storage section store a currently used display format; and
    a display processing functional section performing display processing to make the display section display a retrieved word and pieces of information associated therewith in one of the corresponding display formats that is currently stored in the storage section, wherein different content information associated with the retrieved word is displayed depending upon whether the pieces of information are displayed in the first format or the second format.

2. The electronic apparatus having a dictionary function according to claim 1, further comprising a normal display key for temporarily bringing the apparatus into a normal display mode which corresponds to one of the formats,
    said display processing functional section being configured so as to change a current screen of the display section to a screen according to the normal display mode when the normal display key is operated during a certain display mode other than the normal display mode, and to restore said certain display mode upon cancellation of the normal display mode.

3. The electronic apparatus having a dictionary function according to claim 2, wherein the display processing functional section is configured so as to make the screen of the display section contain a symbol indicating that a current display mode is not the normal display mode while the apparatus is not assuming the normal display mode.

4. An electronic apparatus having a dictionary function, comprising:
    a display section;
    a storage section for storing, for each of words, priorities according which pieces of information associated with a word are to be displayed on the display section;
    a priority key for designating priorities, said priorities determining an order in which pieces of information associated with the word are to be displayed; and
    a display processing functional section for performing a display processing to make the display section display pieces of information associated with a retrieved word in the order of priorities stored in the storage section wherein the designated priorities determine the order in which the information is displayed.

5. The electronic apparatus having a dictionary function according to claim 4, further comprising a normal display key for temporarily bringing the apparatus into a normal display mode,
    said display processing functional section being configured so as to change a current screen of the display section to a screen according to the normal display mode when the normal display key is operated during a certain display mode other than the normal display mode, and to restore said certain display mode upon cancellation of the normal display mode.

6. The electronic apparatus having a dictionary function according to claim 5, wherein the display processing functional section is configured so as to make the screen of the display section contain a symbol indicating that a current display mode is not the normal display mode while the apparatus is not assuming the normal display mode.

7. An electronic apparatus having a dictionary function, comprising:
    a display section;
    a storage section for storing, for each of words, display levels at which pieces of information associated with each word are to be displayed;
    a key for designating one of a plurality of different display levels for a word, at least first and second of the levels representing different types of information concerning the word; and
    a display processing functional section for performing a display processing to make the display section display a retrieved word and pieces of information associated therewith at a corresponding display level stored in the storage section.

8. The electronic apparatus having a dictionary function according to claim 7, further comprising a normal display key for temporarily bringing the apparatus into a normal display mode,
    said display processing functional section being configured so as to change a current screen of the display section to a screen according to the normal display mode when the normal display key is operated during a certain display mode other than the normal display mode, and to restore said certain display mode upon cancellation of the normal display mode.

9. The electronic apparatus having a dictionary function according to claim 8, wherein the display processing functional section is configured so as to make the screen of the display section contain a symbol indicating that a current display mode is not the normal display mode while the apparatus is not assuming the normal display mode.

10. An electronic apparatus having a dictionary function, comprising:
    a display section;
    a storage section for storing, for each of words, items not to be displayed;
    a non-display key for designating an item not to be displayed, out of a plurality of items; and
    a display processing functional section for performing a display processing to make the display section display items other than the item not to be displayed stored in the storage section.

11. The electronic apparatus having a dictionary function according to claim 10, further comprising a normal display key for temporarily bringing the apparatus into a normal display mode, said display processing functional section being configured so as to change a current screen of the display section to a screen according to the normal display mode when the normal display key is operated during a certain display mode other than the normal display mode, and to restore said certain display mode upon cancellation of the normal display mode.

12. The electronic apparatus having a dictionary function according to claim 11, wherein the display processing functional section is configured so as to make the screen of the display section contain a symbol indicating that a current display mode is not the normal display mode while the apparatus is not assuming the normal display mode.

* * * * *